(12) United States Patent
Qian et al.

(10) Patent No.: US 6,574,049 B1
(45) Date of Patent: Jun. 3, 2003

(54) OPTICAL INTERLEAVER AND DE-INTERLEAVER

(75) Inventors: Charles Qian, Cupertino, CA (US);
Jianying Cao, San Jose, CA (US); Yi Qin, Pleasanton, CA (US)

(73) Assignee: Nexfon Corporation, Fremont, CA (US)

( * ) Notice: Subject to any disclaimer, the term of this patent is extended or adjusted under 35 U.S.C. 154(b) by 0 days.

(21) Appl. No.: 10/145,547

(22) Filed: May 14, 2002

(51) Int. Cl.[7] ............................................... G02B 27/14
(52) U.S. Cl. ..................... 359/634; 359/879; 359/883; 359/884; 359/604; 359/608
(58) Field of Search ................. 359/122, 124, 359/127, 618, 629, 634, 498, 497, 499, 484, 495

(56) References Cited

U.S. PATENT DOCUMENTS

| 6,169,604 | B1 | 1/2001 | Cao |
| 6,169,626 | B1 | 1/2001 | Chen et al. |
| 6,275,322 | B1 | 8/2001 | Tai |
| 6,304,689 | B1 | 10/2001 | Dingel et al. |
| 6,310,690 | B1 | 10/2001 | Cao et al. |
| 6,386,718 | B1 * | 5/2002 | Qian ........................... 359/879 |

* cited by examiner

Primary Examiner—Hung Xuan Dang
Assistant Examiner—Joseph Martinez

(57) ABSTRACT

Optical interleavers and de-interleavers that can be used to combine and separate optical signals are described. These devices are based on Mach-Zehnder interferometers having one or two Gires-Toumois mirrors. The optical designs disclosed herein include several key improvements over prior arts. These improvements of interleavers enabled lower cross talk and more accurate channel center frequencies. The new designs also improve on the stability of the devices and substantially reduce the manufacturing costs. With the usage of multi-fiber collimators, a pair of interleaver and de-interleaver is fabricated using the same optical block thereby further reducing the manufacturing costs.

35 Claims, 3 Drawing Sheets

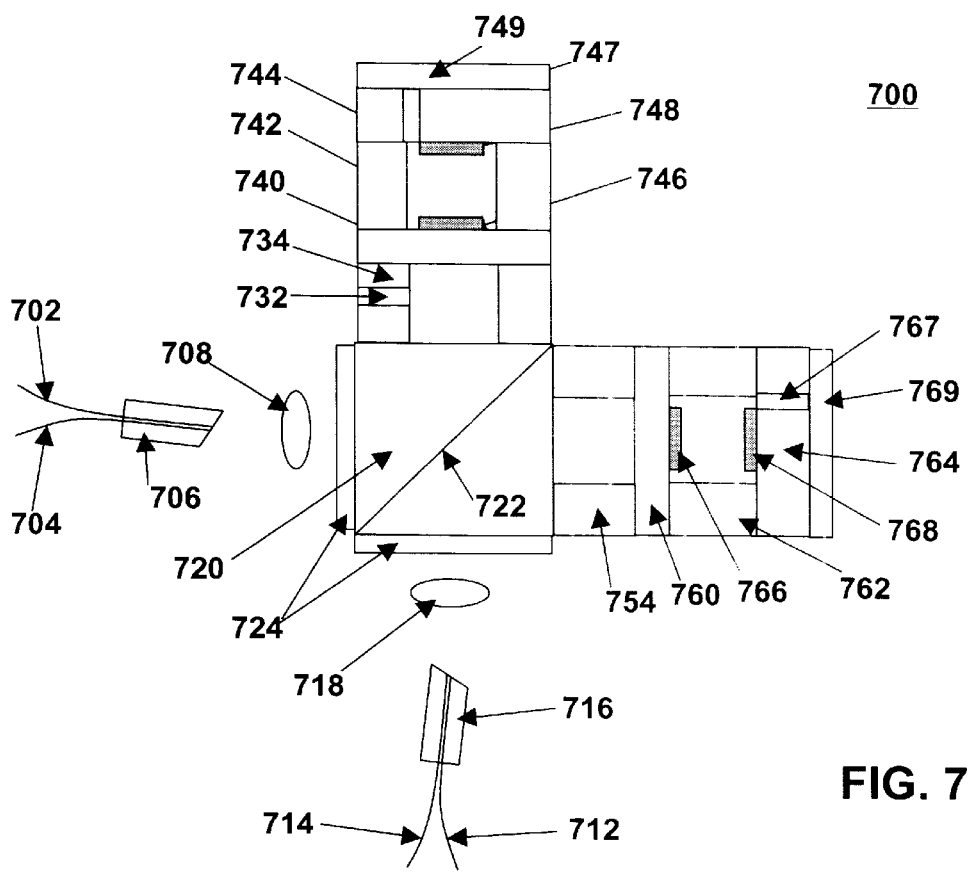
FIG. 7
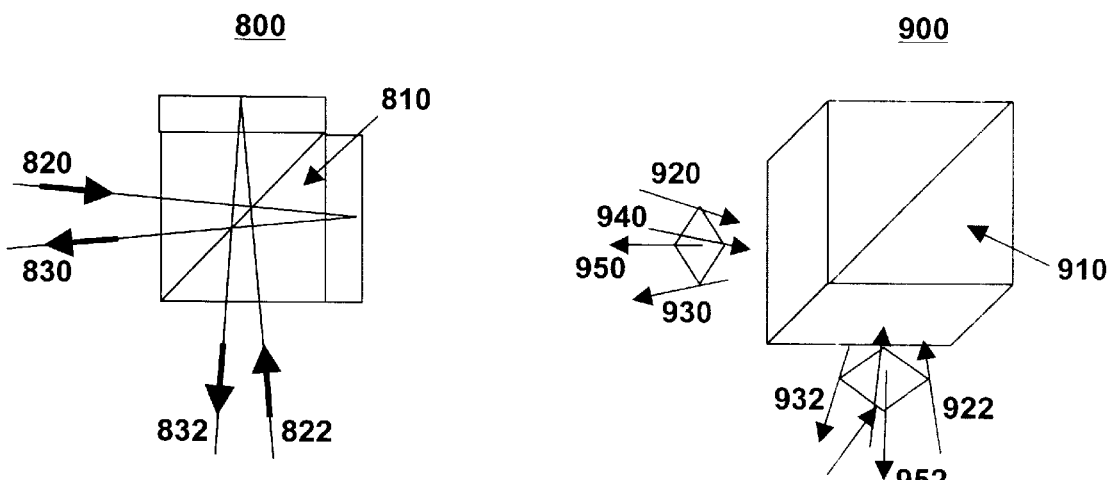
FIG. 8
FIG. 9

OPTICAL INTERLEAVER AND DE-INTERLEAVER

BACKGROUND OF THE INVENTION

1. Field of the Invention

The present invention relates generally to the field of optical communication and more particularly to interleaver and de-interleaver devices used in dense wavelength division multiplexing (DWDM) applications.

2. Background Art

Optical communication has been an active area of development and is crucial to the enhancement of several key technological advancements, e.g., Internet and related new technologies. An important technology that enabled a higher data transmission rate is the dense wavelength division multiplexing (DWDM) technology. In many DWDM applications, there is a need to filter a group of signal channels such that these channels can be further separated, redirected to a different direction, or a fraction of these channels be dropped and added. In certain applications, interleavers and de-interleavers are used to bridge technologies with different channel spacing, enabling the usage of more economical solutions associated with larger channel spacing. In FIG. 1, an interleaver design (100) based upon a Gires-Tournois (GT) mirror (166, 168) and a Michelson interferometer is displayed. These interleavers separate a composite input optical signal (102) into two complementary signals in which the odd data channels are branched into one output (112) and the even channels are directed back into the input (102). In an interleaver application, the frequency space is divided into two groups of pass bands, one for output 1 and the other for output 2. Dingel and Izutsu described this prior art interleaver in a publication (Optics Letters, Jul. 15, 1998, vol 23, pages 1099–1101) and later in a U.S. Patent (U.S. Pat. No. 6,304,689 B1, Oct. 16, 2001). These documents are therefore incorporated herein by reference as relevant background materials. Another improved prior art interleaver is illustrated in FIG. 2. In this device, the input signal (202) is coupled to a 50% non-polarizing cubic beam splitter (220) trough a collimating lens such as a graded index lens (GRIN) lens (208). A GT mirror (266, 268) and a regular mirror (248) are used to form the interferometer. The odd channels return to one output fiber (212) through another lens (218) whereas the even channels return to the input fiber (202) through a lens (208). This type of interleavers and related devices has been disclosed in recent U.S. Patents (U.S. Pat No. 6,169,626 issued Jan. 2, 2001, and U.S. Pat. No. 6,275,322 issued Aug. 14, 2001). These patents are also incorporated herein by reference as relevant background materials. In FIG. 3, another prior art interleaver (300) based on a polarization beam splitter (PBS) and two GT mirrors is displayed. This prior art device has been disclosed recently in U.S. Pat. No. 6,169,604 issued on Jan. 2, 2001 to Cao and U.S. Pat. No. 6,310,690 B1 issued on Oct. 30, 2001 to Cao and Mao. These patents are therefore incorporated herein by reference as relevant background materials. In this prior art device, the input signal (302) is coupled to a PBS (320) through a collimating lens (308). The two arms of the device are two interferometers, one for each of the polarization components. For each interferometer, a polarization and phase-modified GT mirror (332–348) is used as two mirrors of the interferometer. The phases and Free Spectra Ranges (FSR) of the GT mirrors are modified/adjusted using waveplates 332 and 334. The relative phases of the two paths of each of the interferometers are adjusted by changing the orientations and thickness of the waveplates 332 and 334. Both interferometers are adjusted such that the odd channels return to one output fiber (304) through lens (308) whereas the even channels return to the other fiber (312) through another lens (318).

Another related prior art of a GT mirror has been disclosed in a pending U.S. patent application Ser. No. 09/796,565 filed on Mar. 2, 2001 by Qian. This patent is also incorporated herein by reference as relevant background material. As illustrated in FIG. 4, The GT mirror consists of optically contacted front and rear windows, with a precision, temperature insensitive spacer. The sealed cavity is filled with optical medium at certain density such that precise center frequency may be achieved Another cavity may be added in front of the GT such that the relative phase of the GT may be adjusted.

There are several areas of improvements of prior art devices 100 through 300. For instance, the use of a Michelson interferometer with one output returning to the same direction in 100 and 200 requires the use of an optical circulator in the optical "circuit" in order to physically separate the output from the input. Another area of improvements is in the temperature stability of the devices. Device 100 is not based on a balanced design and will require temperature stabilization whereas devices 200 and 300 uses thin glass plates/wave plates for fine adjustments of the interferometers and these thin plates introduces reliability issues such as the use of epoxy and certain temperature related drifts. There is a need therefore for improved art such that more stable and reliable interleaver devices can be fabricated.

SUMMARY OF THE INVENTION

The present invention discloses a group of new optical designs of interleavers and de-interleavers. These new designs are based on Mach-Zehnder interferometers with one or two GT mirrors. The GT mirrors used in these designs have tunable/adjustable FSR and phases. Tuning and adjustment of FSR and phases of these improved devices are accomplished by changing the densities of the optical medium in air-spaced cavities. Another embodiment of the present invention utilizes multi-fiber pigtails and collimators in interleaver and de-interleaver devices. This embodiment enabled device integration such that two or more interleavers can be constructed using the same optical block. Another usage of interleaver and de-interleaver devices with multi-fiber pigtails/collimators is in the area of multi-channel add/drop applications. In this case, each interleaver functions as a pair of interleaver and de-interleaver.

BRIEF DESCRIPTION OF THE DRAWINGS

The aforementioned objects and advantages of the present invention, as well as additional objects and advantages thereof, will be more fully understood hereinafter as a result of a detailed description of preferred embodiments when taken in conjunction with the following drawings in which:

FIG. 7 displays an optical interleaver consists of a Mach-Zehnder interferometer with two GT mirrors in accordance with an embodiment of the present invention;

FIG. 8 shows the input and output light beam directions in an optical add-drop interleaver where the odd channels can be dropped and added in accordance with an embodiment of the present invention;

FIG. 9 illustrates the input and output light beam directions in a pair of optical add-drop interleavers using the same optical block where the odd channels can be dropped and added in accordance with an embodiment of the present invention.

DETAILED DESCRIPTION OF THE INVENTION

The present invention discloses a set of new designs of optical interleaver and de-interleaver. These new designs share several key improvements over prior art devices. The first class of improvements is related to the method and arrangement to tune the devices to ITU frequency grid and relative phases of the two arms of an interferometer. The second group of improvements is based on the usage of multi-fiber pigtails and collimators.

Figure 1:
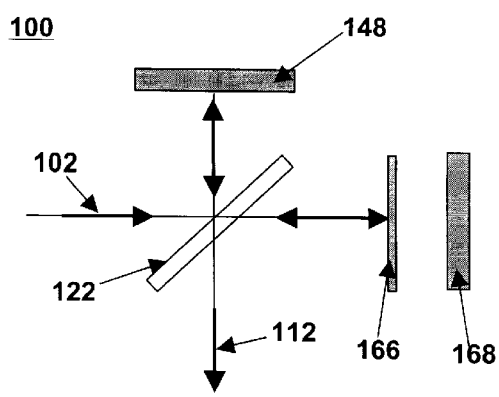
FIG. 1 shows a prior art interleaver consists of a Michelson interferometer with a GT mirror and a regular mirror.
Figure 2:
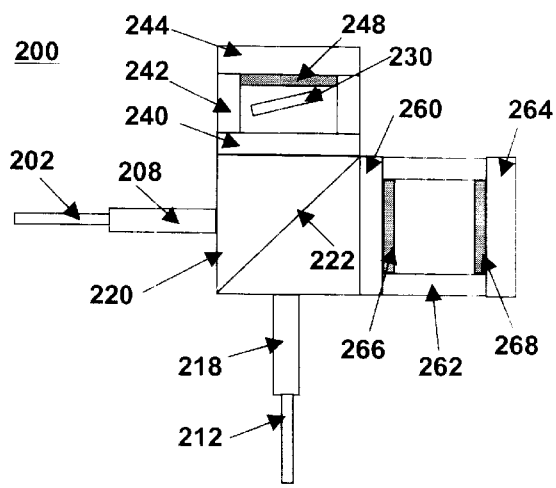
FIG. 2 illustrates another prior art interleaver based on a Michelson interferometer with a GT mirror and a regular mirror.
Figure 3:
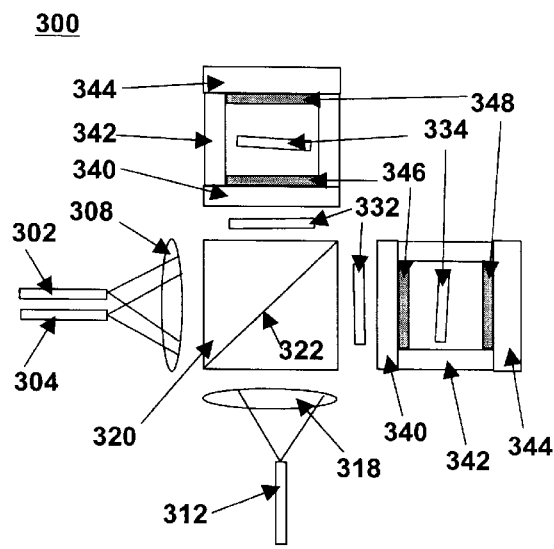
FIG. 3 displays an optical interleaver formed with a PBS and two waveplate-modified GT mirrors.
Figure 4:
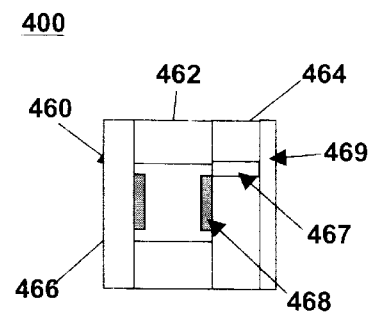
FIG. 4 displays a prior art GT mirror consists of a coated window, a mirror and a precision spacer.
Figure 5:
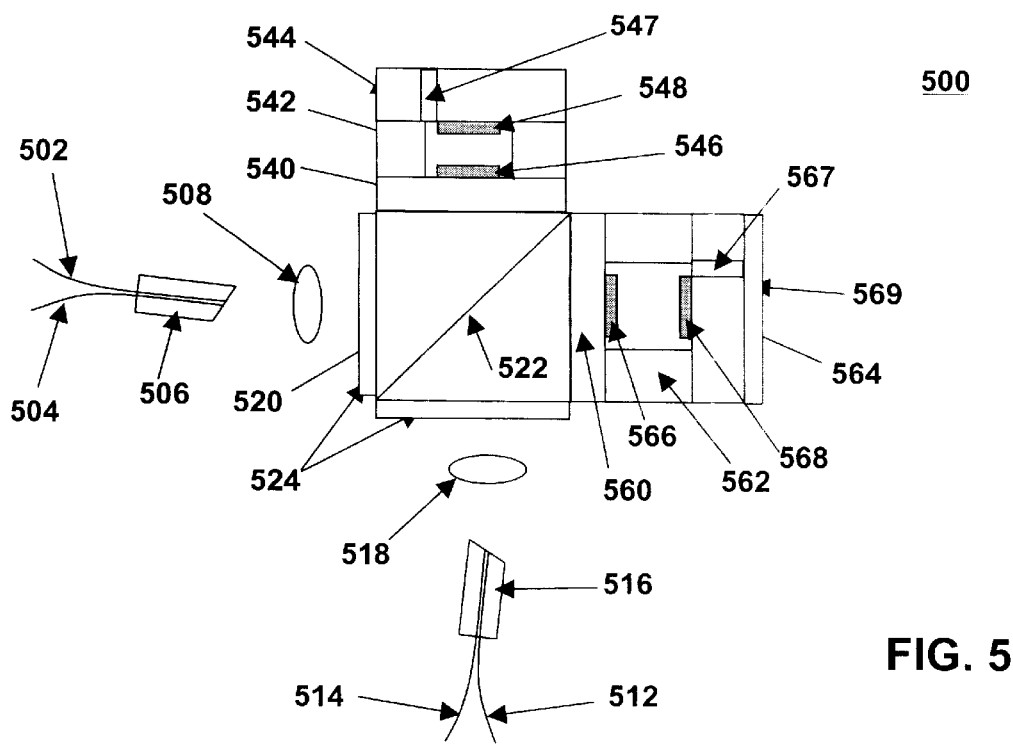
FIG. 5 illustrates an optical interleaver consists of a Mach-Zehnder interferometer with a GT mirror and a regular mirror in accordance with an embodiment of the present invention.

One preferred embodiment of the present invention is illustrated in FIG. 5. One input (502) and one output (504) are coupled to the device through a dual fiber pigtail (506) and a collimating lens (508). The fiber pigtail has a polished and AR-coated output surface. This output surface is not perpendicular to the direction of the fibers and is set to have a few degrees of angle from the normal in order to reduce the return loss of the device. The surfaces of the lens (508) are typically AR-coated to reduce the insertion loss of the device.

A second input (512) and second output (514) are coupled to the device through a second dual fiber pigtail (516) and a second collimating lens (518). The fiber pigtail has a polished and AR-coated output surface. This output surface is not perpendicular to the direction of the fibers and is set to have a few degrees of angle from the normal in order to reduce the return loss of the device. The surfaces of the lens (518) are typically AR-coated to reduce the insertion loss of the device.

Center to the main optical block is a broadband beam splitter (520), the beam splitter consists of two pieces of optical glasses with an interface (522) at the diagonal of the cube. The interface has a polarization insensitive coating with 50% reflection and 50% transmission. The entrance and the exit surfaces of the central optical block are covered with two glass wedges (524). Normally the outside surface of the wedges is AR-coated to reduce the insertion loss of the device.

The interleaver consists of two mirrors attached to the central beam splitter. One of the mirrors is a GT-mirror with a partial reflective surface (R~14%) (566) and a high reflective surface (R~100%) (568). The GT mirror follows the prior art of Qian as disclosed in a pending U.S. patent application Ser. No. 09/796,565 filed on Mar. 2, 2001 by Qian. The GT mirror consists of a front window (560) and a back window (564) and a precision spacer (562) made of low expansion glass such as ULE® of Corning or Zerodur® of Schott. The requirement of the interleaver, the incident angle of the beam, and the optical thickness of the optical coatings determine the thickness of the spacer. For an interleaver used to separate input signal with 50 GHz channel spacing to two outputs with 100 GHz channel spacing, the thickness is about 3 mm. The front window, the air spacer and the back window are attached together through optical contacting process to forms a hermetically sealed cavity. There is a small channel (567) on the back window that is used to change the density of optical medium inside of the cavity. Once the desired optical density is achieved, the cavity is sealed off with another piece of glass (569).

The other mirror is a regular mirror with reflectivity close to 100%. An air spaced cavity is constructed with a front window (540), a precision spacer (542), and a back window (544). The precision spacer (542) is made of low expansion glass such as ULE® of Corning or Zerodur® of Schott. The requirement of the interleaver, the incident angle of the beam, and the optical thickness of the optical coatings determine the thickness of the spacer. For an interleaver used to separate input signal with 50 GHz channel spacing to two outputs with 100 GHz channel spacing, the thickness of the spacer is about 1.5 mm. The front window, the air spacer and the back window are attached together through optical contacting process to form a hermetically sealed cavity. There is a small channel (567) on the back window that is used to change the density of optical medium inside of the cavity. Once the desired optical density is achieved, the cavity may be sealed off with another piece of glass (not shown). The inside surface of the front window normally has an anti-reflective coating (546).

All the interfaces within the interleaver device may be attached together through optical contacting process. Such a process is frequently used to achieve strong and hermetically sealed interface bonding.

Figure 6:
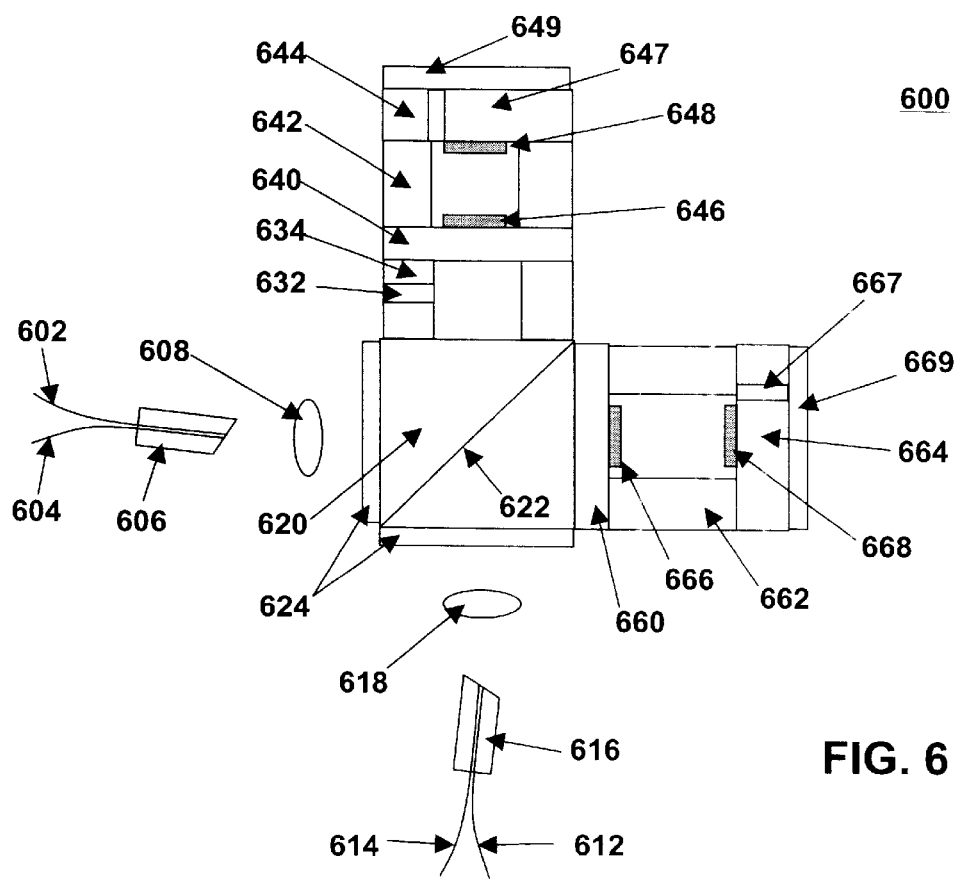
FIG. 6 illustrates an alternate optical interleaver consists of a Mach-Zehnder interferometer with a GT mirror and a regular mirror in accordance with an embodiment of the present invention.

Another preferred embodiment of the present invention is illustrated in FIG. 6. One input (602) and one output (604) are coupled to the device through a dual fiber pigtail (606) and a collimating lens (608). The fiber pigtail has a polished and AR-coated output surface. This output surface is not perpendicular to the direction of the fibers and is set to have a few degrees of angle from the normal in order to reduce the return loss of the device. The surfaces of the lens (608) are typically AR-coated to reduce the insertion loss of the device.

A second input (612) and second output (614) are coupled to the device through a second dual fiber pigtail (616) and a second collimating lens (618). The fiber pigtail has a polished and AR-coated output surface. This output surface is not perpendicular to the direction of the fibers and is set to have a few degrees of angle from the normal in order to reduce the return loss of the device. The surfaces of the lens (618) are typically AR-coated to reduce the insertion loss of the device.

Center to the main optical block is a broadband beam splitter (620), the beam splitter consists of two pieces of optical glasses with an interface (622) at the diagonal of the cube. The interface has a polarization insensitive coating with 50% reflection and 50% transmission. The entrance and the exit surfaces of the central optical block are covered with two glass wedges (624). Normally the outside surface of the wedges is AR-coated to reduce the insertion loss of the device.

The interleaver consists of two mirrors attached to the central beam splitter. One of the mirrors is a GT-mirror with a partial reflective surface (R~14%) (646) and a high reflective surface (R~100%) (648). The GT mirror follows the prior art of Qian as disclosed in a pending U.S. patent application Ser. No. 09/796,565 filed on Mar. 2, 2001 by Qian. The GT mirror consists of a front window (640) and a back window (644) and a precision spacer (642) made of low expansion glass such as ULE® of Corning or Zerodur® of Schott. The requirement of the interleaver, the incident angle of the beam, and the optical thickness of the optical coatings determine the thickness of the spacer. For an interleaver used to separate input signal with 50 GHz channel spacing to two outputs with 100 GHz channel spacing, the thickness is about 3 mm. The front window, the air spacer and the back window are attached together through optical contacting process to form a hermetically sealed cavity. There is a small channel (647) on the back window that is used to change the density of optical medium inside of the cavity. Once the desired optical density is achieved, the cavity is sealed off with another piece of glass (649).

In order to adjust the phase of the GT mirror, another air cavity is constructed through the use of a spacer (634). There is a small channel (632) used to access this cavity such that the density of the optical medium inside may be changed. The cavity may be sealed off with another piece of glass (not shown). In order to reduce the insertion loss of the device, the surface of the front window (640) and the surface of the beam splitter inside of the air cavity is normally AR coated. The thickness of the spacer (632) is not critical and is in the range of 1 to 10 mm. The spacer is preferably made of low expansion glass such as ULE® of Corning or Zerodur® of Schott. The GT mirror, the spacer (632), and the beam splitter are attached together through optical contacting process to forms a hermetically sealed cavity.

The other mirror is a regular mirror with reflectivity close to 100%. An air spaced cavity is constructed with a front window (660), a precision spacer (662), and a back window (664). The spacer (662) is made of low expansion glass such as ULE® of Corning and Zerodur® of Schott. The requirement of the interleaver, the incident angle of the beam, and the optical thickness of the optical coatings determine the thickness of the spacer. For an interleaver used to separate input signal with 50 GHz channel spacing to two outputs with 100 GHz channel spacing, the thickness of the spacer is about 1.5 mm plus that of the thickness of the spacer (632) in front of the GT mirror. The front window, the air spacer and the back window are attached together through optical contacting process to forms a hermetically sealed cavity. There is a small channel (667) on the back window that is used to change the density of optical medium inside the cavity. Once the desired optical density is achieved, the cavity may be sealed off with another piece of glass (not shown). The inside surface of the front window normally has an anti-reflective coating (666).

All the interfaces within the interleaver device may be attached together through optical contacting process. Such a process is frequently used to achieve strong and hermetically sealed interface bonding.

An additional preferred embodiment of the present invention is illustrated in FIG. 7. One input (702) and one output (704) are coupled to the device through a dual fiber pigtail (706) and a collimating lens (708). The fiber pigtail has a polished and AR-coated output surface. This output surface is not perpendicular to the direction of the fibers and is set to have a few degrees of angle from the normal in order to reduce the return loss of the device. The surfaces of the lens (708) are typically AR-coated to reduce the insertion loss of the device.

A second input (712) and second output (714) are coupled to the device through a second dual fiber pigtail (716) and a second collimating lens (718). The fiber pigtail has a polished and AR-coated output surface. This output surface is not perpendicular to the direction of the fibers and is set to have a few degrees of angle from the normal in order to reduce the return loss of the device. The surfaces of the lens (718) are typically AR-coated to reduce the insertion loss of the device.

Center to the main optical block is a broadband beam splitter (720), the beam splitter consists of two pieces of optical glasses with an interface (722) at the diagonal of the cube. The interface has a polarization insensitive coating with 50% reflection and 50% transmission. The entrance and the exit surfaces of the central optical block are covered with two glass wedges (724). Normally the outside surface of the wedges is AR-coated to reduce the insertion loss of the device.

The interleaver consists of two GT mirrors attached to the central beam splitter. Both GT mirrors have a partial reflective surface (80%>R>5%) (746, 766) and a high reflective surface (R~100%) (748, 768). These GT mirrors follow the prior art of Qian as disclosed in a pending U.S. patent application Ser. No. 09/796,565 filed on Mar. 2, 2001 by Qian. The GT mirrors consist of a front window (740, 760) and a back window (744, 764) and a precision spacer (742, 762) made of low expansion glass such as ULE® of Corning or Zerodur® of Schott. The requirement of the interleaver, the incident angle of the beam, and the optical thickness of the optical coatings determine the thickness of the spacer. For an interleaver used to separate input signal with 50 GHz channel spacing to two outputs with 100 GHz channel spacing, the thickness is about 1.5 mm. The front window, the air spacer and the back window are attached together through optical contacting process to form a hermetically sealed cavity. For each of the GT mirrors, there is a small channel (747, 767) on the back window that is used to change the density of optical medium inside the cavity. Once the desired optical density is achieved, the cavity is sealed off with another piece of glass (749, 769).

In order to adjust the phase of the GT mirrors, two air cavities are constructed through the use of two spacers (734, 754). There is a small channel (732) used to access one of the cavities such that the density of the optical medium inside may be changed. The cavity may be sealed off with another piece of glass (not shown). In order to reduce the insertion loss of the device, the surfaces of front windows (740, 760) and the surfaces of the beam splitter inside of the air cavities are normally AR coated. The thickness of the two spacers is identical and (734, 754) is not critical to the performance of the device. Typically the thickness is in the range of 1 to 10 mm. The spacer is preferably made of low expansion glass such as ULE® of Corning or Zerodur® of Schott. The GT mirrors, the spacers (734, 754), and the beam splitter are attached together in accordance with the present invention, as illustrated in FIG. 7, through optical contacting process to forms a hermetically sealed cavity.

All the interfaces within the interleaver device may be attached together through optical contacting process. Such process is frequently used to achieve strong and hermetically sealed interface bonding.

The present invention also discloses a general improvement over prior art interleavers as illustrated in FIG. 8 and FIG. 9. In FIG. 8, an add-drop interleaver device is illustrated. The add-drop interleaver consists of an interleaver optical block, two dual fiber collimators (or equivalently, 4 single fiber collimators), and the necessary packaging of the interleaver. The central block may be one of the embodiments disclosed in the preceding paragraphs (500, 600, or 700), or alternately, one of the prior art central blocks (e.g., 100, 200, or 300). The four fiber add-drop device works in the following way: The input signal (820) with a certain channel spacing (e.g., 50 GHz) is separated into two outputs (830 and 832) with twice of the channel spacing (i.e., 100 GHz) with the reflection (830) carrying the even channels and the transmission (832) carrying the odd channels. This input (820) in combination with the two outputs (830, 832) function as a prior art interleaver. By symmetry, the other input signal (822) with a certain channel spacing (e.g., 50 GHz), is separated into two outputs (832 and 830) with twice of the channel spacing (i.e., 100 GHz) with the reflection (832) carrying the even channels and the transmission (830) carrying the odd channels. This input (822) in combination with the two outputs (832, 830) also function as a prior art interleaver.

The combined four-fiber device as illustrated in FIG. 8 has unique functions. One of the functions is to interchange half of the signal channels (the odd channels) between the two inputs (820, 822). The other application is a group add-drop application with 820 as the signal input, 832 as the drop, 822 as the add input, and 830 as the output. In this case, half of the signal channels (the odd channels) are dropped to 832. The signals associated with even channels from a different source can be added through 822.

The functions of the four-fiber device disclosed here can be duplicated if four fiber pigtails/collimators are used instead of two fiber pigtails/collimators. The directions of optical signals are indicated in FIG. 9 for such an eight-fiber device. The add-drop interleaver consists of an interleaver optical block, two four-fiber collimators (or equivalently, 8 single fiber collimators), and the necessary packaging of the interleaver. The central block may be one of the embodiments disclosed in the preceding paragraphs (500, 600, or 700), or alternately, one of the prior art central blocks (e.g., 100, 200, or 300). The eight-fiber add-drop device works in the following way: The input signal (920) with a certain channel spacing (e.g., 50 GHz) is separated into two outputs (930 and 932) with twice of the channel spacing (i.e., 100 GHz) with the reflection (930) carrying the even channels and the transmission (932) carrying the odd channels. This input (920) in combination with the two outputs (930, 932) function as a prior art interleaver. By symmetry, the other input signal (922) with a certain channel spacing (e.g., 50 GHz), is separated into two outputs (932 and 930) with twice of the channel spacing (i.e., 100 GHz) with the reflection (932) carrying the even channels and the transmission (930) carrying the odd channels. This input (922) in combination with the two outputs (932, 930) also function as a prior art interleaver.

The combined eight-fiber device as illustrated in FIG. 9 has unique functions. One of the functions is to interchange half of the signal channels (the odd channels) between the two inputs (920, 922). The other application is a group add-drop application with 920 as the signal input, 932 as the drop, 922 as the add input, and 930 as the output. In this case, half of the signal channels (the odd channels) are dropped to 932. The signals associated with even channels from a different source can be added through 922.

By symmetry, inputs 940, 942 and outputs 950 and 952 form another add-drop interleaver that functions identical with that of the add-drop interleaver formed by 920, 930, 922 and 932 as described in the proceeding paragraphs.

It will be apparent to those with ordinary skill of the art that many variations and modifications can be made to these interleaver devices disclosed herein without departing form the spirit and scope of the present invention. It is therefore intended that the present invention cover the modifications and variations of this invention provided that they come within the scope of the appended claims and their equivalents.

We claim:

1. An optical interleaver for receiving N (N is an integer$\geq$1) input composite optical signals each having a plurality of M channels, each such channel having a selected bandwidth and center frequency and splitting the input composite signal into a plurality of, but fewer than M channels; the interleaver comprising: a broadband non-polarizing beam splitter having 50% reflectance and 50% transmittance receiving said input composite signal at a selected angle of incidence; at least a pair of cavities, with at least one cavity positioned on each side of the said beam splitter, each optical cavity comprising: two optically transparent, parallel windows having facing surfaces, each surface having an optical coating, said surfaces being separated by a precision spacer forming an hermetically sealed optical cavity between said windows and within said spacer.

2. The optical cavity recited in claim 1 further comprising a channel into said cavity from a location outside said cavity.

3. The optical cavity recited in claim 2 wherein said cavity contains a fluid optical medium of a selected density.

4. The optical cavity recited in claim 3 wherein said fluid optical medium comprises a gas taken from the group consisting of $N_2$, $O_2$, Ne, Ar, Kr, Xe, $SF_6$, $N_2O$, $CO_2$, $CH_4$, $C_2H_6$, $C_3H_8$, chloro- and fluoro-methane, chloro- and fluoro-ethane, chloro- and fluoro-propane, and mixture thereof.

5. The optical cavity recited in claim 3 wherein the channel and cavity may be sealed from outside with another glass plate.

6. The optical cavity recited in claim 3 wherein the channel and cavity are interconnected with an external reservoir such that the density of the fluid optical medium may be controlled by a mechanical, thermal or electrical means to tune the phase and free spectra range of the cavity.

7. The optical cavity recited in claim 1 wherein at least one of the facing surfaces has an anti-reflective coating.

8. The optical cavity recited in claim 1 wherein at least one of the facing surfaces has a reflective coating with a reflectivity in the range of 0% to 100%.

9. The optical cavity recited in claim 1 wherein one of the said facing surfaces has a reflective coating having a reflectivity that is greater than the reflectivity of the reflective coating of the other facing surface.

10. The optical cavity recited in claim 1 wherein said precision spacer is made of a material having a low thermal expansion coefficient such as ULE® from Corning Inc. and Zerodur® from Schott Glass Tech.

11. An optical interleaver recited in claim 1 where the beam splitter is a cubic splitter having two AR coated glass wedges attaching to it.

12. An optical interleaver recited in claim 11 where the input and the outputs are coupled to the device using at least one dual-fiber collimator.

13. An optical interleaver recited in claim 11 where the input and the outputs are coupled to the device using a pair of collimating lenses and at least one dual-fiber pigtail.

14. An optical interleaver recited in claim 11 where the inputs and the outputs are coupled to the device using at least one four-fiber collimator.

15. An optical interleaver recited in claim 11 where the inputs and the outputs are coupled to the device using a pair of collimating lenses and at least one four-fiber pigtail.

16. An optical interleaver recited in claim 11 where the inputs and the outputs are coupled to the device using at least one multi-fiber collimator.

17. An optical interleaver recited in claim 11 where the inputs and the outputs are coupled to the device using a pair of collimating lenses and at least one multi-fiber pigtail.

18. An optical interleaver for receiving N (N is an integer$\geq 1$) input composite optical signals each having a plurality of M channels, each such channel having a selected bandwidth and center frequency and splitting the input composite signal into a plurality of output optical signals each output signal having a plurality of, but fewer than M channels;

the interleaver comprising:
a broadband non-polarizing beam splitter having 50% reflectance and 50% transmittance receiving said input composite signal at a selected angle of incidence;
at least a pair of optical high reflectors each having reflectivity near 100%, with one reflector positioned on each side of the said beam splitter;
at least a partial reflector having reflectivity 5% to 60%, placed between the said beam splitter and the said high reflector.

19. An optical interleaver recited in claim 18 where the input and the outputs are coupled to the device using at least one dual-fiber collimator.

20. An optical interleaver recited in claim 18 where the input and the outputs are coupled to the device using a pair of collimating lenses and at least one dual-fiber pigtail.

21. An optical interleaver recited in claim 18 where the inputs and the outputs are coupled to the device using at least one four-fiber collimator.

22. An optical interleaver recited in claim 18 where the inputs and the outputs are coupled to the device using a pair of collimating lenses and at least one four-fiber pigtail.

23. An optical interleaver recited in claim 18 where the inputs and the outputs are coupled to the device using at least one multi-fiber collimator.

24. An optical interleaver recited in claim 18 where the inputs and the outputs are coupled to the device using a pair of collimating lenses and at least one multi-fiber pigtail.

25. An optical interleaver recited in claim 18 wherein the density of the fluid optical medium in at least part of the interleaver is adjusted to enhance the performance of the interleaver.

26. An optical interleaver recited in claim 25 wherein said fluid optical medium comprises a gas taken from the group consisting of $N_2$, $O_2$, Ne, Ar, Kr, Xe, $SF_6$, $N_2O$, $CO_2$, $CH_4$, $C_2H_6$, $C_3H_8$, chloro- and fluoro-methane, chloro- and fluoro-ethane, chloro- and fluoro-propane, and mixture thereof.

27. An optical interleaver for receiving N (N is an integer$\geq 1$) input composite optical signals each having a plurality of M channels, each such channel having a selected bandwidth and center frequency and splitting the input composite signal into a plurality of output optical signals each output signal having a plurality of, but fewer than M channels;

the interleaver comprising:
a broadband polarizing beam splitter receiving said input composite signal at a selected angle of incidence and separating two polarization components of the incoming signal;
at least a pair of optical high reflectors each having reflectivity near 100%, with one reflector positioned on each side of the said beam splitter;
at least a pair of partial reflector having reflectivity 5% to 60%, placed between the said polarizing beam splitter and the said high reflector;
at least a pair of waveplates each placed in between the said partial reflector and high reflector;
at least a pair of waveplates each placed in between the said polarizing beam splitter and said partial reflector.

28. An optical interleaver recited in claim 27 where the input and the outputs are coupled to the device using at least one dual-fiber collimator.

29. An optical interleaver recited in claim 27 where the input and the outputs are coupled to the device using a pair of collimating lenses and at least one dual-fiber pigtail.

30. An optical interleaver recited in claim 27 where the inputs and the outputs are coupled to the device using at least one four-fiber collimator.

31. An optical interleaver recited in claim 27 where the inputs and the outputs are coupled to the device using a pair of collimating lenses and at least one four-fiber pigtail.

32. An optical interleaver recited in claim 27 where the inputs and the outputs are coupled to the device using at least one multi-fiber collimator.

33. An optical interleaver recited in claim 27 where the inputs and the outputs are coupled to the device using a pair of collimating lenses and at least one multi-fiber pigtail.

34. An optical interleaver recited in claim 27 wherein the density of the fluid optical medium in at least part of the interleaver is adjusted to enhance the performance of the interleaver.

35. An optical interleaver recited in claim 34 wherein said fluid optical medium comprises a gas taken from the group consisting of $N_2$, $O_2$, Ne, Ar, Kr, Xe, $SF_6$, $N_2O$, $CO_2$, $CH_4$, $C_2H_6$, $C_3H_8$, chloro- and fluoro-methane, chloro- and fluoro-ethane, chloro- and fluoro-propane, and mixture thereof.

* * * * *